(12) United States Patent
Papadopoulos et al.

(10) Patent No.: US 6,266,424 B1
(45) Date of Patent: Jul. 24, 2001

(54) ELECTRET MICROPHONE CIRCUIT WITH LOW BATTERY DISABLE

(75) Inventors: Costas Papadopoulos; David J. Truesdell, both of Acton, MA (US)

(73) Assignee: VXI Corporation, Rollinsford, NH (US)

( * ) Notice: Subject to any disclaimer, the term of this patent is extended or adjusted under 35 U.S.C. 154(b) by 0 days.

(21) Appl. No.: 08/967,930

(22) Filed: Nov. 12, 1997

Related U.S. Application Data (60) Provisional application No. 60/030,546, filed on Nov. 13, 1996, provisional application No. 60/042,080, filed on Mar. 28, 1997, and provisional application No. 60/053,888, filed on Jul. 28, 1997.

(51) Int. Cl.[7] .............................. H04R 3/00; H02B 1/00
(52) U.S. Cl. .......................... 381/113; 381/111; 381/122; 381/123
(58) Field of Search ................................ 381/122, 123, 381/92, 91, 111, 113, 112, 114, 115

(56) References Cited

U.S. PATENT DOCUMENTS 5,170,151 * 12/1992 Hochstein .............................. 340/636
5,185,789 * 2/1993 Hanon et al. ......................... 379/395
5,239,579 * 8/1993 Schuh .................................. 379/395
5,577,129 * 11/1996 Ehara .................................. 381/113
5,579,397 * 11/1996 Ikeda et al. .......................... 381/113

* cited by examiner

*Primary Examiner*—Xu Mei
(74) *Attorney, Agent, or Firm*—Samuels, Gauthier & Stevens, LLP.

(57) ABSTRACT

A battery circuit for coupling a battery source to an electret microphone. The circuit includes impedance circuitry for providing appropriate bias impedance for a desired microphone sensitivity, and disconnect circuitry for automatically disconnecting the battery source from the electret microphone in response to detecting a low voltage state in order to prevent distortion and low output level of the microphone. In an alternative embodiment of the invention there is provided second impedance circuitry for driving corresponding inputs with minimal loss. In another alternative embodiment of the invention there is provided a compensation circuit which operates to extend battery source life and prevent lower output at lower voltage.

23 Claims, 6 Drawing Sheets

ELECTRET MICROPHONE CIRCUIT WITH LOW BATTERY DISABLE

PRIORITY

This application claims priority from provisional applications Ser. No. 60/030,546 filed Nov. 13, 1996; No. 60/042,080 filed Mar. 28, 1997; and No. 60/053,888 filed Jul. 28, 1997.

BACKGROUND OF THE INVENTION

The invention relates to battery circuits for electret microphones having uniform performance.

Electret microphones are widely used today in voice communications for their small size, light weight and high output. These microphones require a DC supply in order to operate because of an internal JFET circuit common to all electrets. Also available are the conventional dynamic microphones which are larger, heavier, with much lower output levels but require no external DC power.

In "integrated" or built-in applications such as corded, cordless and cellular telephones, electret mic bias is provided internally without difficulty. Stand-alone desk microphones or headsets are frequently used with telephones, PC sound cards or DVD (Digital Voice over Data) modems. There may be no provision to obtain DC bias from the input of the equipment that the microphone is connected to. If DC bias is an option, it will require reference to a technical manual and opening of the cabinet in order to move a switch or jumper to enable the bias path. Many consumers are reluctant to go inside the equipment and prefer a microphone solution that is ready to use.

Figure 1:
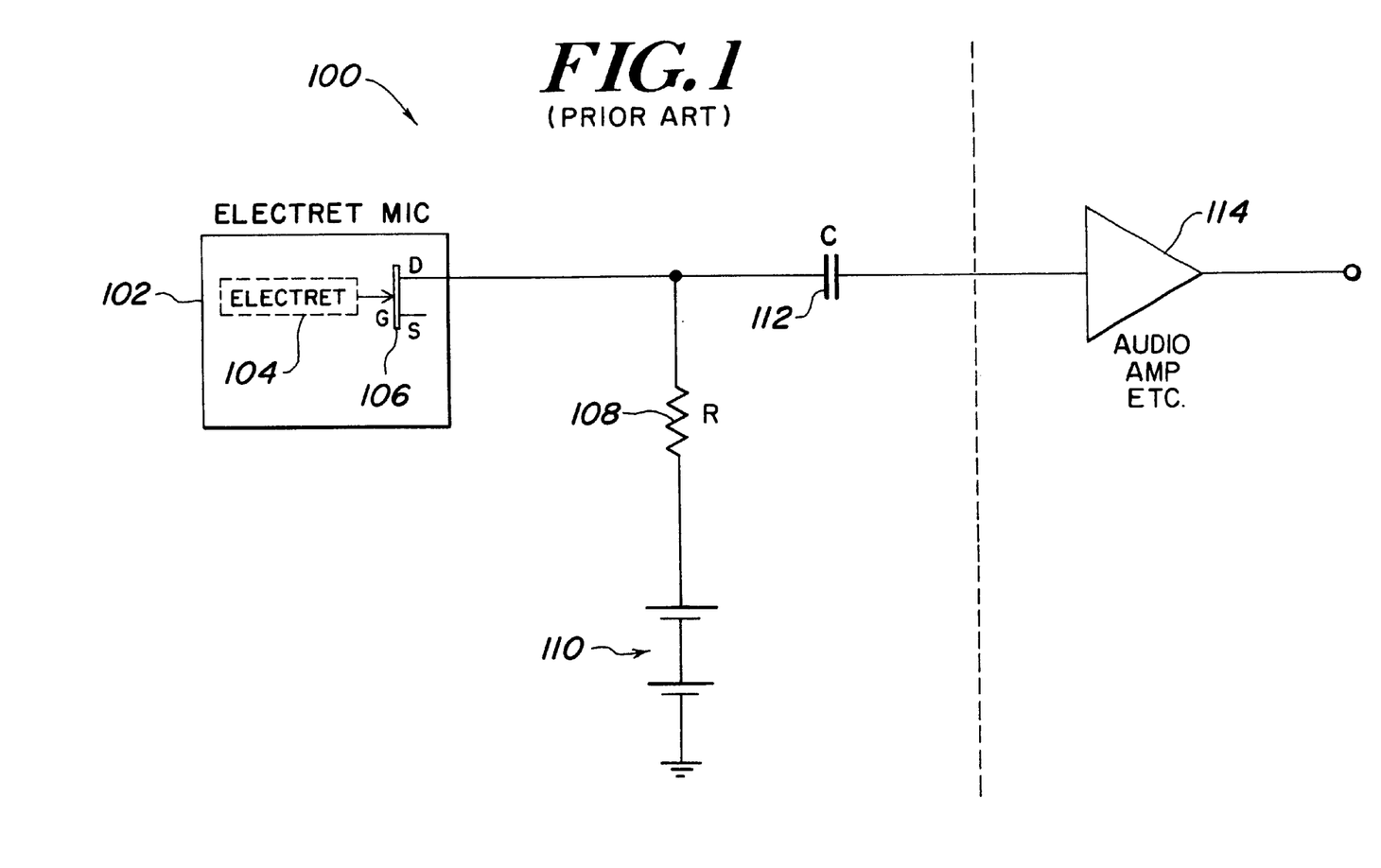
FIG. 1 is a schematic diagram of a simple battery box circuit for electret microphone operation.

A schematic diagram of a simple "battery box" circuit 100 for electret microphone operation is shown in FIG. 1. The circuit includes an electret mic 102 having an electret element 104 and a JFET transistor 106. A resistor 108 provides a DC path for the JFET drain current and isolates the audio output from the very low impedance of battery 110. The JFET drain terminal has a very high output impedance, so the resistor 108 brings the output down to a known, lower level typically 1–5 kΩ. The range of currents for the chosen electret element 104 will determine the required battery voltage, such that after the voltage drop through the resistor, enough voltage remains at the drain for the JFET to operate in the active region. Typical operating current for a Gentex Model 3065 electret microphone is 100–300 µA with R at 2 kΩ from a 3V battery.

A capacitor 112 separates the DC path from the input of audio amplifier circuitry 114 and must be large enough for the input impedance of the amplifier and the lowest audio frequency of interest. For example, 1 µF will high pass 100 Hz into 1500 Ω at −3 dB.

As long as the battery voltage in FIG. 1 is sufficient to keep the FET in the active region, normal operation will continue. The user, however, has no indication or knowledge of battery condition and eventually reduced voltage will cause FET saturation, lower output level and audio distortion. Before the condition is severe enough to be recognized by the user, speech intelligibility to human listeners and speech recognition by software programs will be adversely affected. Adaptive software which "learns better as it goes" will begin storing distorted data at low battery voltages and when the batteries are replaced, the user may sound "foreign" relative to the stored information. If the circuit of FIG. 1 were connected to equipment configured for dynamic microphones only, the much higher output level from the electret mic could cause overload and distortion.

SUMMARY OF THE INVENTION

Accordingly, in accordance with one embodiment of the invention there is provided a battery circuit for coupling a battery source to an electret microphone. The circuit includes impedance circuitry for providing appropriate bias impedance for a desired microphone sensitivity, and disconnect circuitry for automatically disconnecting the battery source from the electret microphone in response to detecting a low voltage state in order to prevent distortion and low output level of the microphone.

In an alternative embodiment of the invention there is provided a battery circuit for coupling a battery source to an electret microphone which includes first impedance circuitry for providing appropriate bias impedance for a desired microphone sensitivity, disconnect circuitry for automatically disconnecting the battery source from the electret microphone in response to detecting a low voltage state, and second impedance circuitry for driving corresponding inputs with minimal loss.

In another alternative embodiment of the invention there is provided a battery circuit for coupling a battery source to an electret microphone which includes first impedance circuitry for providing appropriate bias impedance for a desired microphone sensitivity, disconnect circuitry for automatically disconnecting the battery source from the electret microphone in response to detecting a low voltage state, second impedance circuitry for driving corresponding inputs with minimal loss, and a compensation circuit which operates to extend battery source life and prevent lower output at lower voltage.

DETAILED DESCRIPTION OF THE ILLUSTRATED EMBODIMENTS

Figure 2:
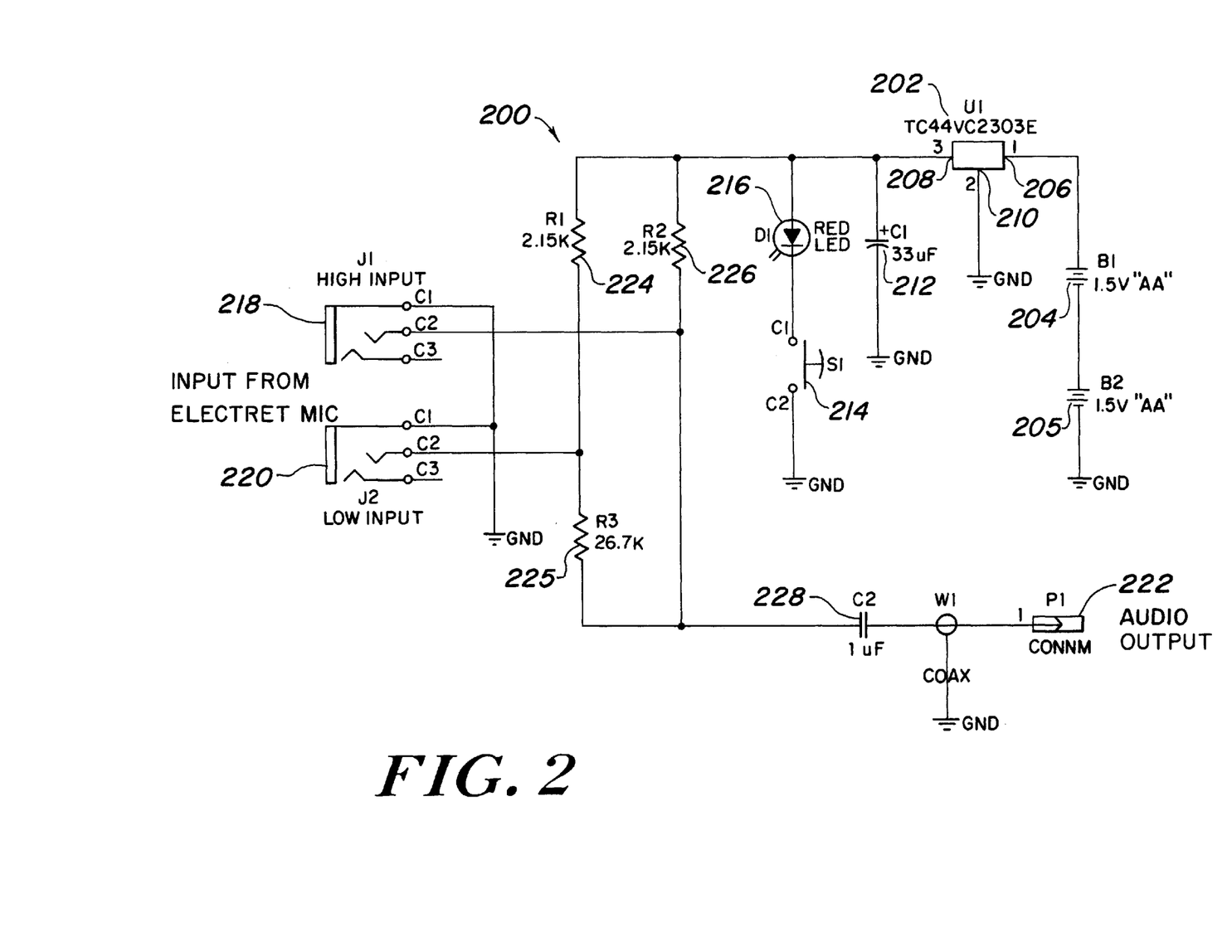
FIG. 2 is a schematic circuit diagram of an exemplary battery circuit in accordance with the invention.

FIG. 2 is a schematic circuit diagram of an exemplary battery circuit 200 in accordance with the invention. The circuit 200 includes a voltage detector/switch 202 (for example TelCom Semiconductor TC44VC2303E) which is connected to the series connected batteries 204,205. The batteries are, for example, conventionally available 1.5 V "AA" alkaline batteries. As long as the voltage at input terminal 1 (206) of switch 202 exceeds a threshold, in this instance 2.3 V, an output terminal 3 (208) of switch 202 sources current to the circuit with negligible voltage drop and only 1 µA current drain to ground via terminal 2 (210). Below that threshold, terminal 3 (208) is off and the circuit is disabled. Thus, uniform performance is assured when the batteries are good and the user is reminded to replace them when the electret mic (not shown) is disconnected by detector/switch 202.

A capacitor 212 acts as a short at audio frequencies in order to establish a known AC ground independent of the switch 202 on resistance. A momentary switch 214 and LED 216 complete the circuit for verifying battery condition. No resistor is needed in series with LED 216 because the LED current is limited by switch 202 on resistance.

Two inputs for the electret microphone are provided. A high input 218 is used when the audio output 222 is expected to be at a high or electret level, and a low input 220 is used to emulate a dynamic mic level at the output 222.

A typical voltage ratio of 18 dB is seen when comparing the outputs of small electret and dynamic microphones. A bias resistor network consisting of resistors 224, 225 and 226 presents the correct voltage level to a coupling capacitor 228 and the output 222: 0 dB for high input 218 and −18 dB for low input 220 at a constant 2kΩ equivalent resistance. No on-off switch is required because at a continuous typical current drain of 200 μA from the two AA batteries, the voltage cut-off point will be reached in 386 days. This is derived from AA rated capacity of 2.45 Ah at a load resistance of 24 Ω draining down to 0.8 V per cell.

Battery life can be further extended by using a lower switch 202 threshold voltage and/or lower bias resistor values by adding an inductor in the bias current path. For instance, 1.06 kΩ in series with 150 mH will have half the DC voltage drop as 2 kΩ, but the same audio output at 1 kHz. End of life at 2.1 V will occur in about 445 days of continuous operation.

FIG. 2 depicts the circuit of a product than can be sold separately for connecting an electret microphone to end equipment that may or may not provide mic bias. In the consumer market, it can be advantageous to attach the circuit permanently to the microphone or headset cord, thus avoiding inadvertent disconnection at jacks 218 and 220 and saving the cost of two jacks and one mic plug.

Figure 3:
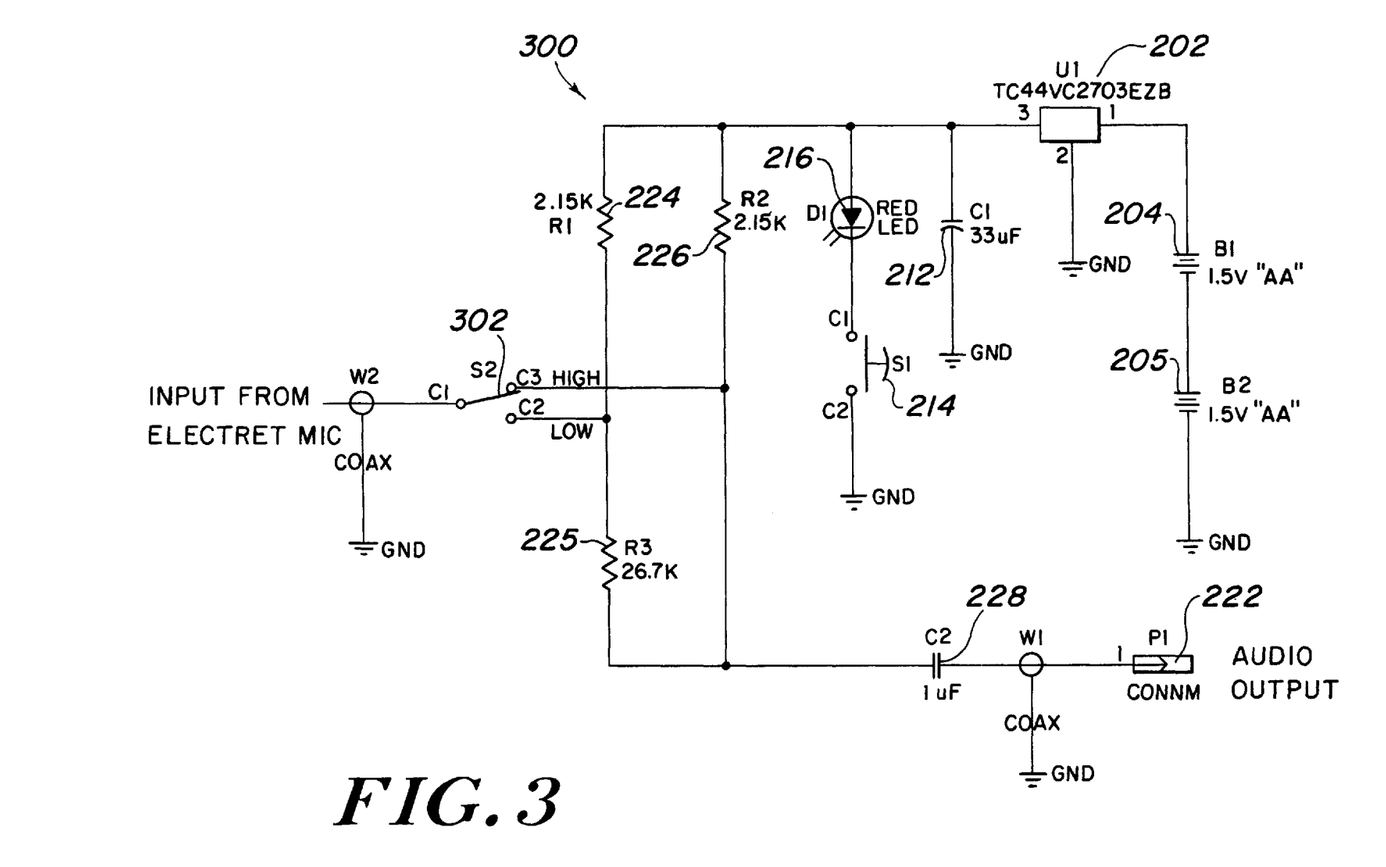
FIG. 3 is a schematic circuit diagram of an alternative exemplary embodiment of a battery circuit in accordance with the invention.

FIG. 3 is a schematic circuit diagram of an alternative exemplary embodiment of a battery circuit 300 in accordance with the invention, which may be permanently connected to the mic cord. Switch 302 is used to emulate electret or dynamic output levels by connecting them to the corresponding resistor node. Otherwise, the circuit operation and elements are the same as circuit 200 of FIG. 2.

Some PC sound cards have a low terminating resistor to ground at their mic inputs, for example 560Ω for the Creative Labs Soundblaster®. When connected to a bias circuit with 2 kΩ equivalent output impedance, the resulting 13.2 dB loss in audio level can interfere with speech recognition performance. It may be possible to overcome the voltage loss by using a higher sensitivity microphone at significantly greater cost.

Figure 4:
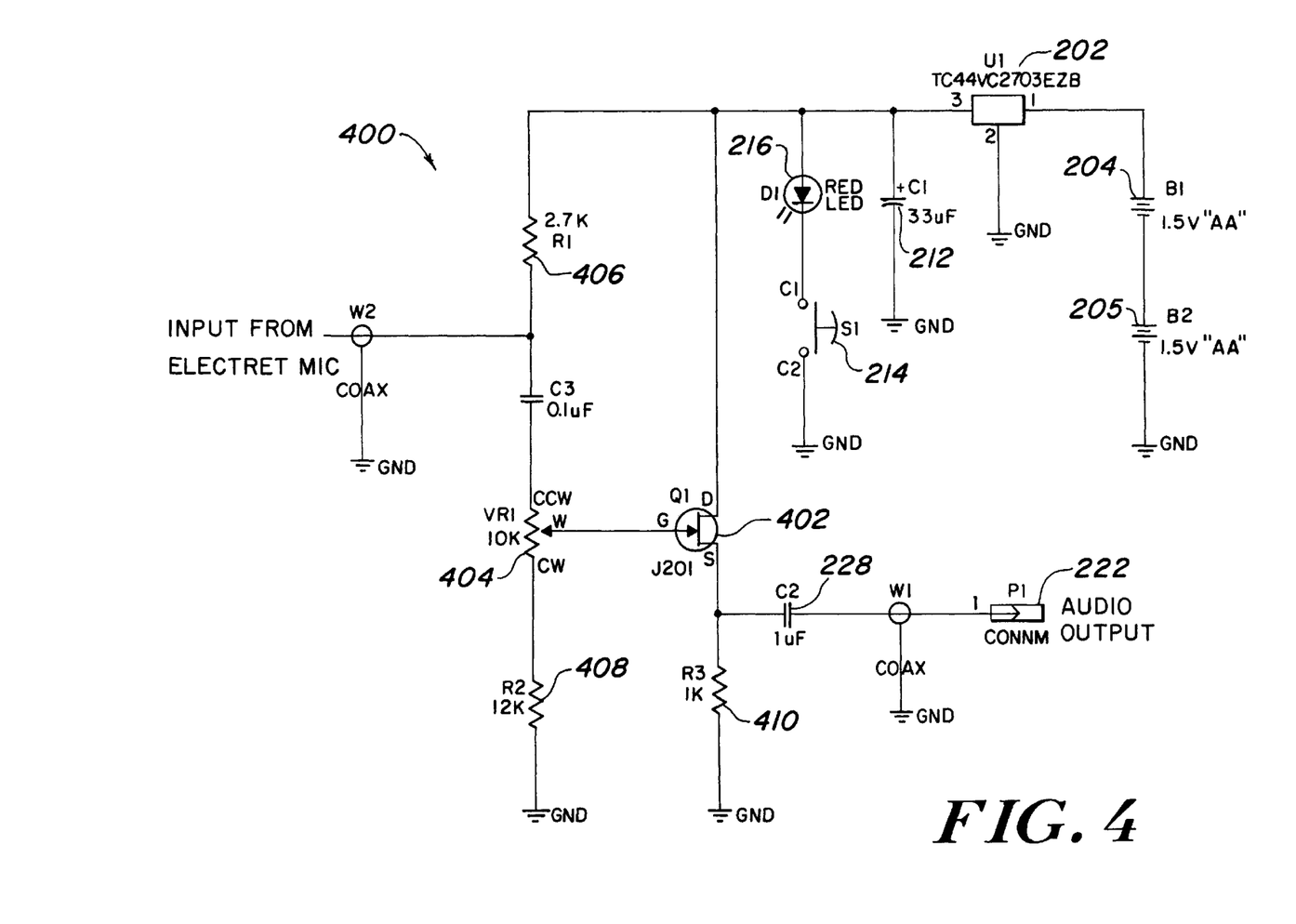
FIG. 4 is a schematic circuit diagram of another alternative exemplary embodiment of a battery circuit in accordance with the invention.

Instead, this loss can be prevented with the addition of a FET voltage follower stage which has an inherently low output impedance. FIG. 4 is a schematic circuit diagram of another alternative exemplary embodiment of a battery circuit 400 in accordance with the invention.

Circuit 400 has the advantage of minimizing the aforementioned loss by the addition of a JFET voltage follower stage 402 which has an inherently low output impedance. An additional advantage of circuit 400 that may also be applied to circuits 200 and 300 is the adjustment of variable resistor 404 that compensates for mic to mic variation. Electret microphones are more cost effective when sold at the usual +/−4 dB variation in sensitivity. Speech recognition is enhanced when the range is limited to +/1.5 dB, but at higher mic cost. Resistors 406 and 408, as well as variable resistor 404, are scaled to limit the 8 dB spread of the lower cost mic to 3 dB or less. Useful values are 2.7 kΩ for resistor 406, 10 kΩ for variable resistor 404 and 12 kΩ for resistor 408.

The voltage gain at the drain of a JFET is expressed as $$A_v = g_m R_L$$

where $g_m$ is FET transconductance and $R_L$ is load resistance. When the drain bias resistance is 2.7 kΩ instead of the previous value of 2 kΩ, there is a gain increase of 1.35. Thus, for a microphone at −4 dB or 0.63 of nominal sensitivity, the wiper of the variable resistor 404 can be adjusted to the maximum position such that 1.35×0.63=0.85, or −1.4 dB from nominal. More rigorously, −4 dB changes to −1.5 dB when the 22 kΩ load of the summed value of the variable resistor 404 and resistor 408 is included. Similarly, a +4 dB mic changes to +0.2 dB when the variable resistance is moved to minimum.

The variable resistor 404 and resistor 408 terminate the gate of JFET 402 to ground. Since the gate current is extremely low, typically −10 pA for Siliconix J201, there is no opportunity for wiper noise of the variable resistor to become audible because 10 pA×22 kΩ=220 nV, when compared with 10 mV typical audio levels.

The output impedance of the source follower JFET 402 is the reciprocal of its transconductance in parallel with a resistor 410. When the resistor 410 is chosen as 1 kΩ for a drain current of 100 μA, transconductance is about 800 μS and output impedance is approximately 560Ω, so minimizing the large voltage drop incurred in previous circuits if connected to a Soundblaster®-type card.

As before, battery life can be extended for the same end-of-life voltage at the electret by placing an inductor in series with a lower value of the resistor 406. A bipolar emitter follower may also be used instead of the JFET source follower 402 with substantially equivalent performance. One more resistor and capacitor are needed with the more economical bipolar transistor, thus total cost is nearly equal.

FIG. 3 illustrates the battery circuit 300 for providing a bias voltage to an electret microphone. The circuit 300 provides the correct audio output to inputs that expect an electret (high level 0 dB) or dynamic (low level −18 dB) microphone, by way of the switch 302. In either switch position, the effective bias resistance is the same 2 KΩ because of the inverted delta arrangement of resistors 224, 225 and 226 where R1//(R2+R3)=R2//(R1+R3)=2 KΩ.

It is well understood that when battery voltage is high, the JFET internal to the electret microphone is in a constant current region, so the FET drain is providing a constant electrical output for a given acoustic input. When the battery voltage is appreciably reduced, so is the FET output and the apparent sensitivity of the electret.

The circuit 300 uses voltage detector/switch 202 to provide a sharp low battery cutoff and prevent speech distortion. Voltage detector ICs are manufactured for a limited number of fixed voltages that are usually trimmed by the foundry at the IC wafer level. Therefore, the cost can be high and only justifiable if the desired voltage value is readily available off the shelf.

Other options for voltage detection relying on common components exhibit a slow transition from the on to the off state. This uncertain transition in the case of an electret drawing 200 μA from two "AA" batteries will last for several days. An example of such a circuit is a transistor with a base-to-emitter resistor. When the current through $R_{BE}$ causes the voltage to exceed $V_{BE}$ or approximately 0.6 V, the transistor is on, at lower voltages it is off. It is also well known that between the off state and the on or saturated state is the active region which is an uncertain or "soft" area for voltage detection purposes. More complicated circuits use comparators and resistors. However, comparators draw significant current and few IC types are available for low voltage operation.

Figure 5:
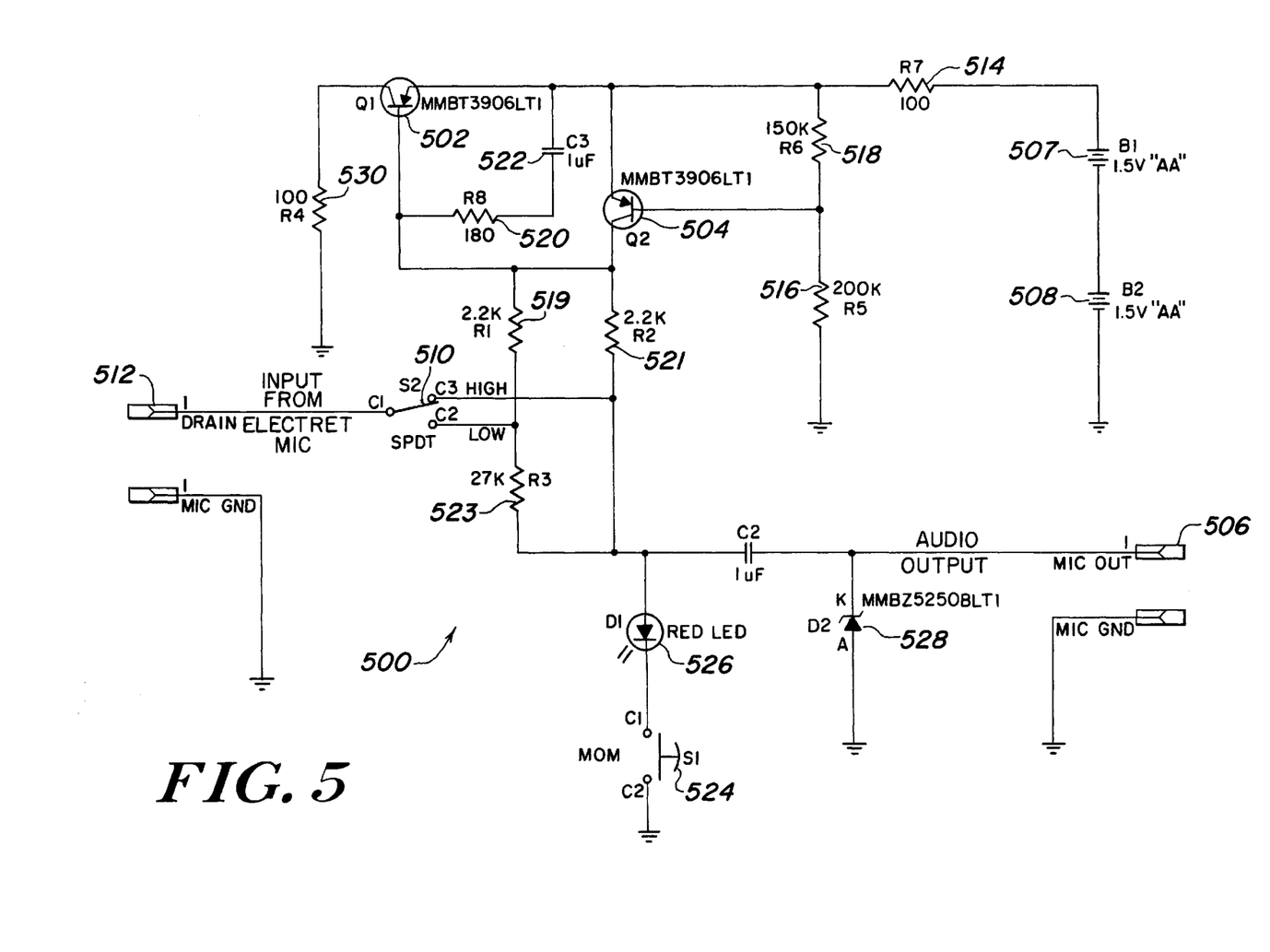
FIG. 5 is a schematic circuit diagram of yet another alternative exemplary embodiment of a battery circuit in accordance with the invention.

FIG. 5 is a schematic circuit diagram of yet another exemplary embodiment of a battery circuit 500 in accordance with the invention. The circuit 500 relies on two PNP transistors 502 and 504 to provide a rapid, abrupt voltage cut-off function. The voltage threshold is derived from two resistor values and is therefore selectable at will. Additional RC components prevent a rise or fall of audio output voltage at output 506 as the transistors pass through the active region with diminishing battery voltage. These RC components provide a constant audio output at a battery voltage lower than with the voltage detector IC, thus extending battery life of series coupled batteries 507 and 508. There is no reason to restrict the choice of batteries to two "AA" cells in series. Because of the constant, low current nature of the electret FET, any cell size and any voltage up to the 40 V JFET breakdown is suitable.

A detailed explanation of circuit 500 will be provided starting with a normal, fresh battery condition and switch 510 in the high position. Switch 510 receives input from the drain 512 of the electret mic JFET (not shown). Total current is low (typically 200 $\mu$A), so voltage drop across resistor 514 (100$\Omega$) is only 20 mV. Essentially full battery voltage appears across series coupled resistors 516 and 518.

The base emitter junction of transistor 504 will clamp the voltage across the resistor 518 to 0.6 V and current through the resistor 516 will be (3–0.6)/200K=12 $\mu$A, while the current through the resistor 518 is 0.6/150K=4 $\mu$A. Base current is therefore 8 $\mu$A. The collector of transistor 504 has only one normal DC current path to ground, into the electret JFET drain. This constant, low current of approximately 200 $\mu$A will cause transistor 504 to saturate at this forced low beta of 25. With the transistor 504 saturated, the transistor 502 is off, and resistor 520 and capacitor 522 are AC shorted. The electret mic sees a bias established by resistors 519, 521 and 523 as well as resistor 514 defining a resistance of R2//(R1+R3)+R7=2146$\Omega$.

As before, the voltage gain at the drain of the JFET in the electret capsule is $A_v = g_m R_L$ so there is a sensitivity increase of 0.6 dB relative to a bias resistor of 2 K$\Omega$. When momentary switch 524 is pressed to test battery condition, the bias resistor string conducts the current through LED 526 to ground providing visual confirmation of adequate battery voltage.

Zener diode 528 can be optionally added at the audio output 506 to provide circuit protection by clamping negative transients to 0.6 V and positive to 20 V. As battery voltage decreases, transistor 504 will come out of saturation into the active region and this mode will be detailed hereinafter. Eventually, after a further battery voltage decline, the transistor 504 collector-emitter voltage will reach 0.6 V and transistor 502 will turn on. Significant current will flow through transistor 502, only limited by low value resistors 514 and 530 and transistor 502 saturation voltage. The resistor 514 is disposed between the batteries 507 and 508, and voltage sense resistors 518 and 516.

As the transistor 502 current begins to flow there is an additional drop at the resistor 514 causing an accelerated voltage reduction across resistors 518 and 516. At this point, transistor 504 will turn off abruptly and so will the electret mic. This condition will occur when the resistor 518 and 516 currents are equal, and the resistor 518 voltage drop is almost 0.6 V. That is, 0.6 V(150K+200K)/150K=1.4 V.

Note that the battery voltage is higher at this point because of the transistor 502 current through resistor 514. Also, the transistor 502 continues to conduct as the transistor 504 remains off. There is no way for the batteries to ever pass through this voltage threshold again. There is no voltage uncertainty or bounce to cause intermittent electret operation and therefore interrupted speech.

The transistor 502 current, once begun will continuously discharge the weakened batteries. The onset of the transistor 502 current is when the transistor 504 collector emitter voltage is 0.6 V and just prior to that battery voltage will be 1.4 V+0.6 V=2.0 V. In other words, cut-off voltage threshold is a function of the resistor 516 and 518, and $V_{BE}$, independent of transistor beta. It should be noted at this point that the voltage cut-off circuitry of circuit 500 can replace the voltage detector IC in circuits 200, 300 and 400.

A constant audio output will be obtained from the electret through a technique that compensates for lower sensitivity at reduced battery voltage. Measurements of sensitivity versus voltage for a Gentex Model 3065 electret show a 2 dB reduction between 3.0 V and 2.0 V with most of the change near the lower voltage. As described heretofore, the transistor 504 becomes active at some point above 2.0 V. In the active mode, the transistor 504 is no longer an AC short in the resistor bias string between the electret and the batteries, it exhibits some effective resistance. This $R_{eff}$ is shunted by resistor 520 in series with capacitor 522. The limit of the effective resistance, at high frequencies and low voltages is the value of resistor 520, and at mid frequency twice the value of resistor 520 when the capacitor 522 reactance magnitude equals the resistor 520. This corner frequency is approximately 558 Hz, inside the 300 to 1000 Hz portion of the audio spectrum that is vital for speech recognition.

Accordingly, just before voltage cut-off the bias resistor string consists of the composite 2146$\Omega$ derived above in series with twice the value of resistor 520, or 2146+360=2506$\Omega$. This results in an apparent "gain" of 20 log(2506/2146)=1.3 dB to compensate for the sensitivity reduction of 2 dB. Without capacitor 522 and resistor 520, there is a significant and undesirable sensitivity increase caused by the high impedance at the transistor 504 collector in the active mode. This increase is detrimental to speech recognition by computer software programs because they are optimized for a constant audio level. A low value of capacitor 522 will cause a gain increase at higher frequencies, while a low value for resistor 520 will preclude a sensitivity increase when transistor 504 is active.

Appropriate values are obtained by measurement and computer simulation. It is vital to vary voltage and frequency while evaluating electret sensitivity, aiming to keep audio output nearly flat and nearly constant at all frequencies of interest. The component values chosen resulted in a gain slope of less than 0.5 dB and a gain change of less than 0.7 dB between the fresh battery condition and any lower voltage above cut-off.

An additional benefit of resistor 514 is that it is much higher than the effective cell resistance of the batteries, thus improving simulation accuracy and preventing battery chemistry or size from affecting circuit performance.

Referring back to FIG. 3, the battery circuit 300 provides a bias voltage to an electret microphone, intended primarily but not exclusively for speech recognition applications that rely on personal computers with sound cards. The circuit 300 provides the correct audio output to equipment that expects an electret (high level) or dynamic (approximately 22 dB lower level) microphone by way of switch 302. In either switch position, the effective bias resistance is the same 2 KΩ because of the inverted delta arrangement of resistors 224, 225 and 226 where R1//(R2+R3)=R2//(R1+R3)=2 KΩ.

Figure 6:
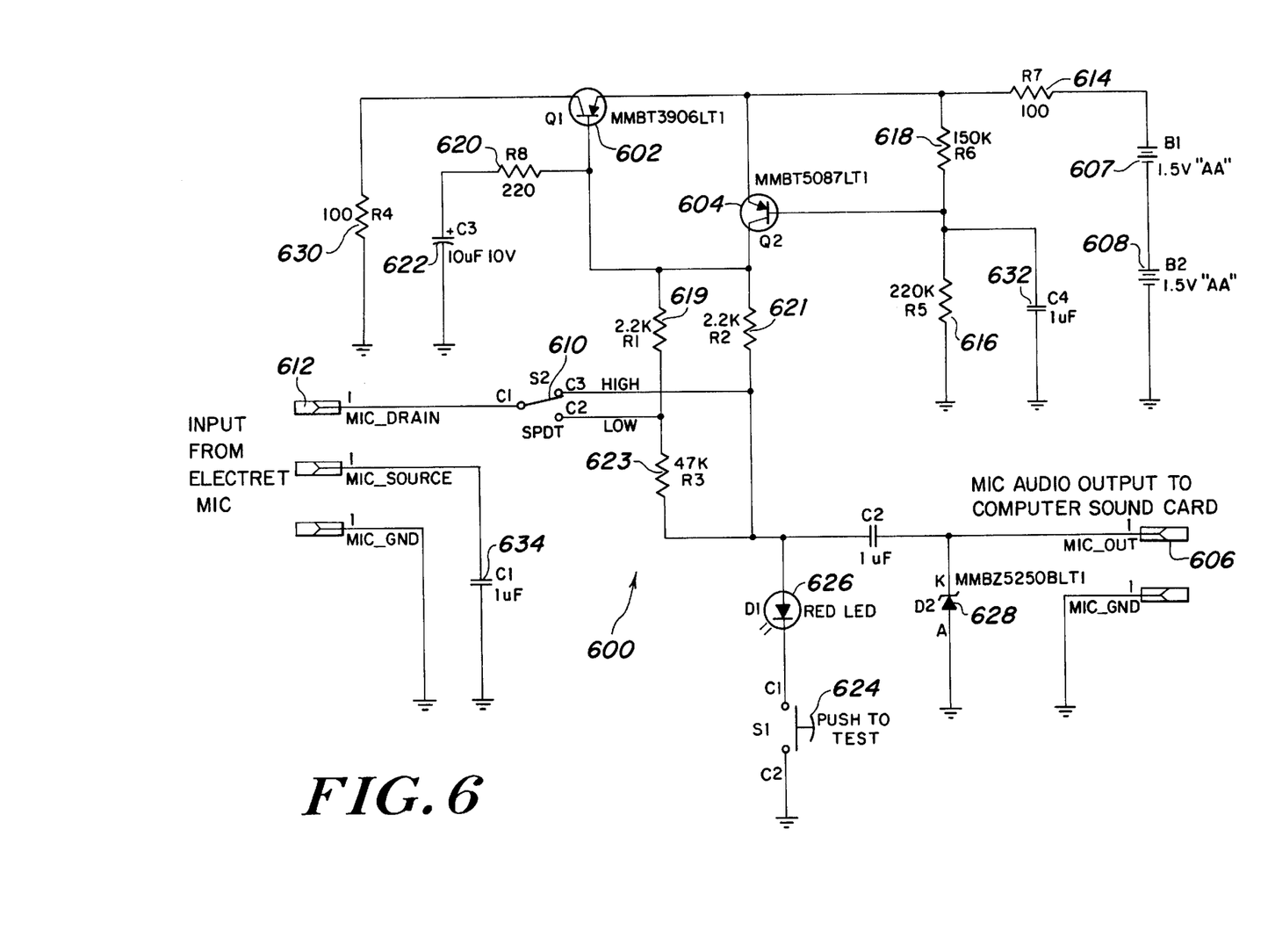
FIG. 6 is a schematic circuit diagram of yet another alternative exemplary embodiment of a battery circuit in accordance with the invention.

FIG. 6 is a schematic circuit diagram of yet another alternative exemplary embodiment of a battery circuit 600 in accordance with the invention. The circuit 600 relies on two PNP transistors 602 and 604 to provide a clean, abrupt voltage cutoff function. The voltage threshold is derived from two resistor values and is therefore selectable at will. It will be understood that the remaining RC components prevent a rise or fall of audio output level as the transistors pass through the active region with diminishing battery voltage. These RC parts provide a constant audio output at a battery voltage lower than with the voltage detector IC thus extending battery life. There is no reason to restrict the choice of series batteries 607 and 608 to two "AA" cells in series. Because of the constant, low current nature of the electret FET, any cell size and any voltage up to the 40 V JFET breakdown is suitable.

A detailed explanation of circuit 600 is now provided starting with a normal, fresh battery condition and switch 610 in the high position. Total current is low, e.g. 200 µA, so voltage drop across resistor 614 is only 20 mV. Essentially full battery voltage appears across resistors 618 and 616. The base emitter junction of transistor 604 will clamp the voltage across resistor 618 to 0.6 V, and the current through resistor 616 will be (3V−0.6)/220K=11 µA.

This current is the only DC current drawn from the batteries for voltage detection purposes and is progressively reduced as the batteries come down. Thereafter, the resistor 618 current will be 0.6V/150K=4 µA. Therefore, the transistor 604 base current is 7 µA. The collector of transistor 604 has only one DC current path to ground, into the electret JFET drain at node 612. This constant, low current of approximately 200 µA will cause transistor 604 to saturate at the forced low beta of 200 µA/7 µA=29.

With transistor 604 saturated, the transistor 602 is off, resistor 620 and capacitor 622 are shorted in parallel with resistor 614 to AC ground. With capacitor 622 large, the electret sees a bias resistance defined by resistors 619, 621, 623, 614 and 620 having a value R2//(R1+R3)+R7//R8= 2106+69=2175Ω.

The voltage gain at the drain of the JFET in the electret capsule is proportional to the drain resistance so there is a sensitivity increase of 0.7 dB relative to a bias resistor of 2 KΩ. When momentary switch 624 is pressed to test battery condition, the bias resistor string conducts current through LED 626 to ground providing visual confirmation to adequate battery voltage, slightly greater than one LED drop or 1.8 V.

Zener diode 628 can be optionally added at the audio output 606 to provide overvoltage protection, clamping negative transients to 0.6 V and positive to 20 V.

As battery voltage decreases, the transistor 604 will ease out of saturation into the active region. This mode will be described in detail hereinafter. Eventually after a further battery voltage decline, the transistor 604 collector-emitter voltage will increase to 0.6 V and the transistor 602 will turn on. Significant current will flow through transistor 602, only limited by transistor 602 saturation voltage and low value resistors 614 and 630.

With resistor 614 disposed between the batteries and voltage sense resistors 618 and 616, as transistor 602 current begins to flow there is additional voltage drop at resistor 614 causing an accelerated voltage reduction across resistors 618 and 616. At this point transistor 604 will turn off abruptly and so will the electret. This condition will occur when currents of resistors 616 and 618 are equal and the resistor 618 voltage drop is almost 0.6 V. That is, 0.6V(150K+220K)/150K=1.48 V, assuming very high transistor DC current gain.

It will be appreciated that the battery voltage is higher at this point because of transistor 602 current through resistor 614 and that transistor 602 continues to conduct as transistor 604 remains off. There is no way for the batteries to ever pass through this voltage threshold again. There is no voltage uncertainty of bounce to cause intermittent electret operation and therefore interrupted speech. The transistor 602 current, once begun will continuously discharge the weakened batteries. The onset of transistor 602 current occurs when the transistor 604 collector emitter voltage is 0.6 V and just prior to that battery voltage is 1.48 plus approximately 20 mV across resistor 614. As described so far, cutoff voltage threshold is a function of resistors 616 and 618, and $V_{BE}$ if transistor current gain is high.

Ordinary values of DC current gain such as 150 for transistor 604 (e.g. Motorola MMBT5087) will cause the transistor to cut off when base current is reduced to 200/150=1.3 µA, which then implies that resistor 616 is conducting transistor 604 base current and resistor 618 current. This changes the cutoff voltage to 0.6V+220K(4 µA+1.3 µA)=1.76 V.

An additional benefit of resistor 614 being much higher than the effective cell resistance of the batteries, is to improve circuit analysis accuracy and prevent battery chemistry or size from affecting circuit performance.

Capacitor 632 at the transistor 604 base causes a short delay when power is first applied saturating the transistor harder and preventing a "race" with the cutoff condition. It should be noted that the voltage cutoff circuitry of circuit 600 can replace the voltage detector IC in circuits 200, 300 and 400 at greater complexity but lower cost.

It will now be shown that a constant audio output can be obtained from the electret through a technique that compensates for lower output at reduced battery voltage. Measurements of mic sensitivity versus voltage for a Gentex Model 3065 electret show a 2 dB reduction between 3.0 V and 2.0 V with most of the change crowded near the lower voltage. As described heretofore, the transistor 604 becomes active at some point between 1.48 and 1.76 V. In the active mode, transistor 604 is no longer an AC short in the resistor bias string between the electret and the batteries, it exhibits some effective resistance. This $R_{eff}$ is in series with resistor 614 and is shunted by resistor 620 in series with capacitor 622. The limit of the effective resistance, at high frequency and low voltage is the value of resistor 620, and at some low frequency it is twice the value of resistor 620, when the capacitor 622 reactance magnitude equals resistor 620. This corner frequency is approximately 72 Hz, well below the 300 Hz to 6 kHz portion of the audio spectrum that is vital for speech recognition.

Accordingly, just before voltage cutoff the bias resistor string changes from the composite 2175Ω derived above to R2//(R1+R3) in series with resistor 614 or 2106+220= 2326Ω. This results in an "apparent gain" of at least 20 log(2326/2175)=0.6 dB to compensate for the sensitivity reduction of 2 dB. Without capacitor 622 and resistor 620, there is a significant and unpredictable sensitivity increase caused by the high impedance at the transistor 604 collector in the active mode. This increase is detrimental to speech recognition by computer software programs because they are optimized for a consistent audio level. A low value for capacitor 622 will cause a gain increase only at higher frequencies while a low value for resistor 620 will preclude a sensitivity increase when transistor 604 is active.

Beyond the preceding circuit analysis, component values are optimized by acoustic measurement and computer simulation. It is vital to vary voltage and frequency at both switch 610 positions while evaluating electret sensitivity, aiming to keep audio output nearly flat and nearly constant at all frequencies of interest.

The component values shown resulted in a gain-frequency slope of less than 0.5 dB and a gain-voltage change of less than 0.7 dB between the fresh battery condition and any lower voltage above cutoff. Similar behavior and slightly higher "apparent gain" is obtained when capacitor 622 is not returned to ground but connected to the emitter of transistor 604.

The source terminal of the electret FET is connected to ground with a capacitor 634. The capacitor bypasses the JFET source-to-ground resistor inside the mic housing. Since the output is obtained from the drain, this common source mode results in a mic sensitivity benefit of 3 to 6 dB. A circuit board is inevitably required for the entire voltage cutoff circuit, so it is painless to realize this sensitivity increase by adding the capacitor to the circuit board rather than to the miniature mic housing.

The foregoing description has been set forth to illustrate the invention and is not intended to be limiting. Since modifications of the described embodiments incorporating the spirit and substance of the invention may occur to persons skilled in the art, the scope of the invention should be limited solely with reference to the appended claims and equivalents thereof.

What is claimed is:

1. A low current circuit for coupling an electret microphone to a battery source and to a computer microphone port, comprising:

passive and active circuit components for providing appropriate bias impedance for a desired microphone sensitivity, said components being shared between a DC bias path from said battery source to said electret microphone and an impedance setting path from said electret microphone to said computer microphone port; and an electronic switch circuit for automatically disconnecting and not reconnecting said battery source from said electret microphone, thus disabling said electret microphone in response to detecting a low voltage state in order to prevent distortion and low output level of said microphone, wherein said electronic switch operates at current levels substantially below ten milliamperes.

2. The circuit of claim 1, wherein said electronic switch circuit comprises a voltage detector.

3. The circuit of claim 1 further comprising alternate microphone input connectors to provide a microphone output level equivalent to a dynamic or an electret microphone.

4. The circuit of claim 1 further comprising a switch which provides a microphone output level equivalent to a dynamic or an electret microphone.

5. The circuit of claim 1 further comprising means for adjusting microphone output level to minimize sensitivity variations between microphones.

6. The circuit of claim 1 further comprising an indicator which verifies a normal voltage condition.

7. The circuit of claim 1, wherein said circuit components comprises an inductor which extends microphone operation to lower voltages.

8. The circuit of claim 1 further comprising means for bypassing a source of said electret microphone in order to increase microphone sensitivity.

9. A low current circuit for coupling an electret microphone to a battery source and to a computer microphone port, comprising:

passive and active circuit components for providing appropriate bias impedance for a desired microphone sensitivity, said components being shared between a DC bias path from said battery source to said electret microphone and an impedance setting path from said electret microphone to said computer microphone port;

an electronic switch circuit for automatically disconnecting and not reconnecting said battery source from said electret microphone, thus disabling said electret microphone in response to detecting a low voltage state in order to prevent distortion and low output level of said microphone, wherein said electronic switch operates at current levels substantially below ten milliamperes; and an impedance network for driving said computer microphone port with minimal loss.

10. The circuit of claim 9, wherein said electronic switch circuit comprises a voltage detector.

11. The circuit of claim 9 further comprising alternate microphone input connectors to provide a microphone output level equivalent to a dynamic or an electret microphone.

12. The circuit of claim 9 further comprising a switch which provides a microphone output level equivalent to a dynamic or an electret microphone.

13. The circuit of claim 9 further comprising means for adjusting microphone output level to minimize sensitivity variations between microphones.

14. The circuit of claim 9 further comprising an indicator which verifies a normal voltage condition.

15. The circuit of claim 9, wherein said first circuit components comprises an inductor which extends microphone operation to lower voltages.

16. The circuit of claim 9, wherein said impedance network comprises a FET source follower.

17. The circuit of claim 9, wherein said impedance network comprises a bipolar transistor emitter follower.

18. A circuit for coupling an electret microphone to a battery source and to a computer microphone port, comprising:

passive and active circuit components for providing appropriate bias impedance for a desired microphone sensitivity, said components being shared between a DC bias path from said battery source to said electret microphone and an impedance setting path from said electret microphone to said computer microphone port;

an electronic switch circuit for automatically disconnecting and not reconnecting said battery source from said electret microphone, thus disabling said electret microphone in response to detecting a low voltage state in order to prevent distortion and low output level of said microphone, wherein said electronic switch operates at current levels substantially below ten milliamperes;

an impedance network for driving said computer microphone port with minimal loss; and a compensation circuit which operates to extend battery source life and maintain said desired microphone sensitivity at lower voltage.

19. The circuit of claim 18, wherein said electronic switch circuit comprises discrete components to detect voltage thresholds.

20. The circuit of claim 19, wherein said discrete components comprise resistors.

21. The circuit of claim 18, wherein said electronic switch circuit operates to abruptly cut off said battery circuit to prevent intermittent outputs.

22. The circuit of claim 18, wherein said electronic switch circuit operates to discharge said battery source in response to detecting a low voltage state.

23. The circuit of claim 18, wherein said compensation circuit comprises a series RC circuit.

* * * * *